C. PEARSON.
MOWING MACHINE.
APPLICATION FILED DEC. 22, 1913.
1,237,690.
Patented Aug. 21, 1917.
2 SHEETS—SHEET 2.
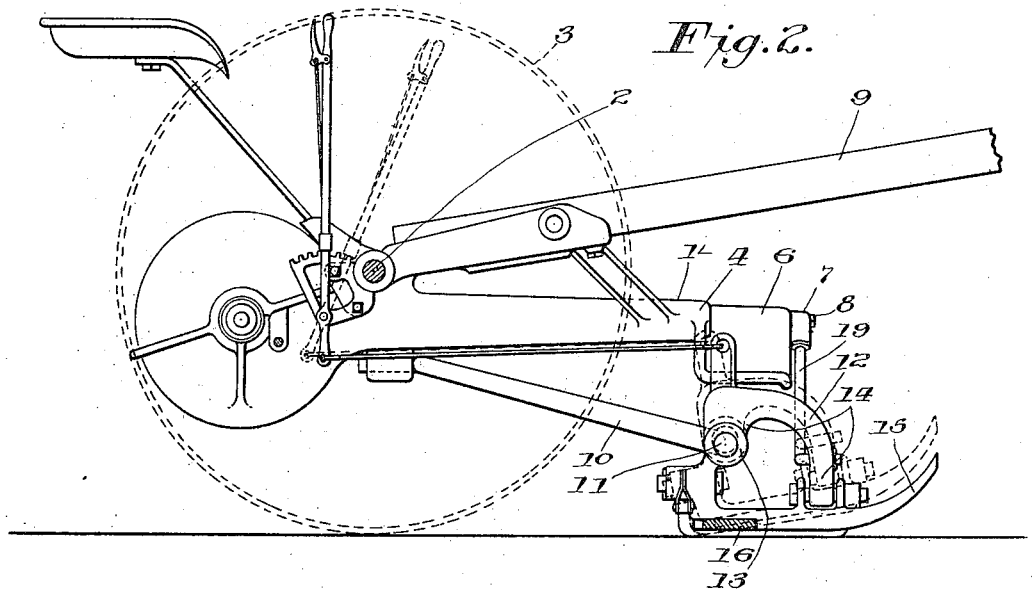
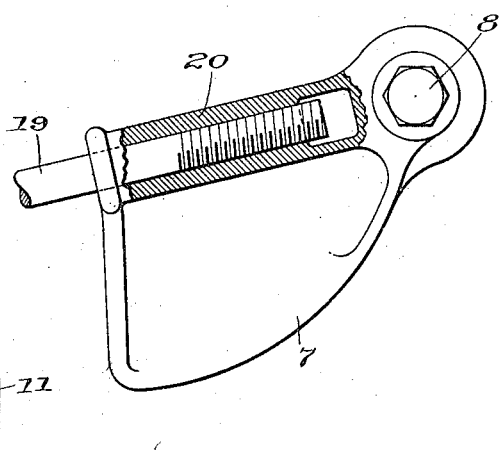
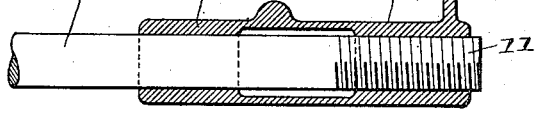
Witnesses:
C. C. Palmer
F. W. Hoffmeister
Inventor:
Charles Pearson,
By Chas. E. Lord
Atty.

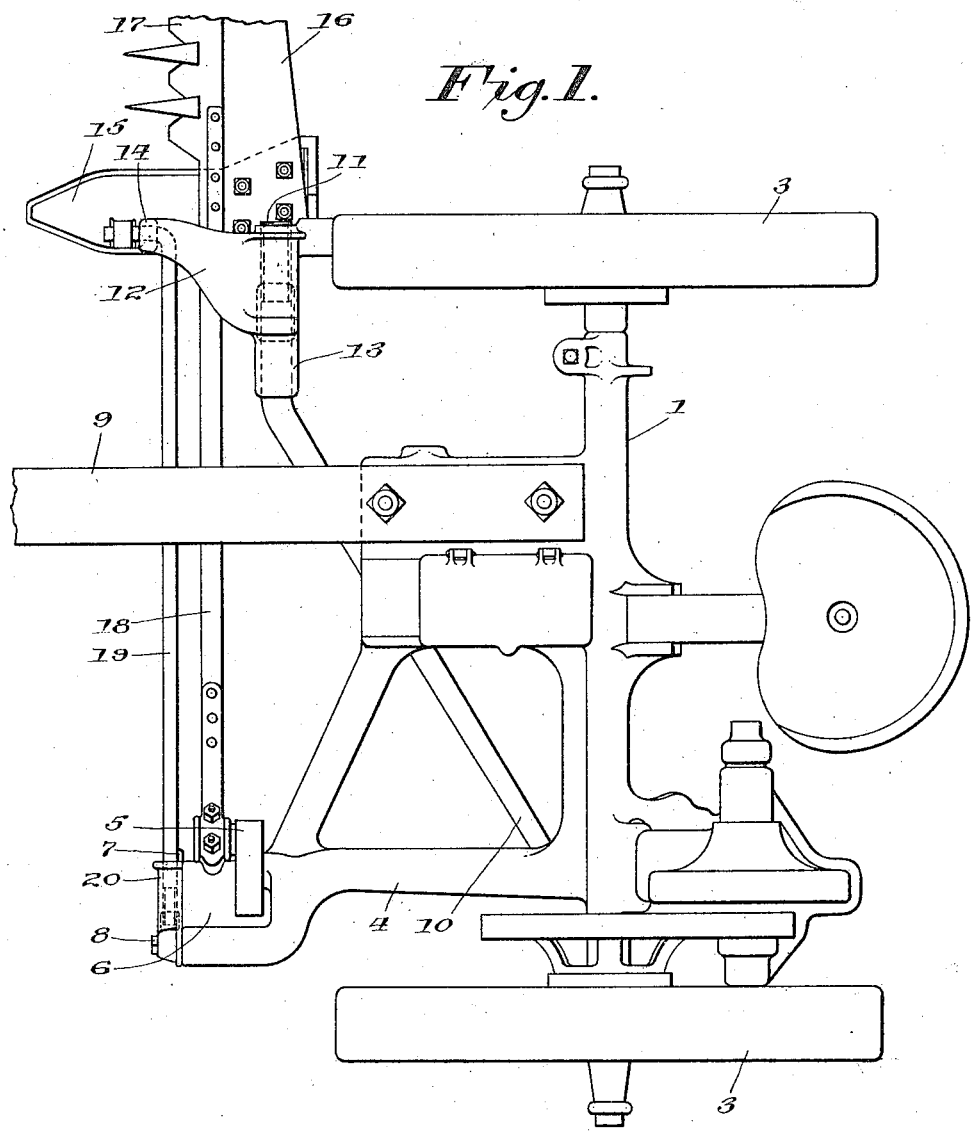

UNITED STATES PATENT OFFICE.

CHARLES PEARSON, OF CHICAGO, ILLINOIS, ASSIGNOR TO INTERNATIONAL HARVESTER COMPANY OF NEW JERSEY, A CORPORATION OF NEW JERSEY.

MOWING-MACHINE.

1,237,690.  Specification of Letters Patent.  Patented Aug. 21, 1917.

Application filed December 22, 1913. Serial No. 808,145.

*To all whom it may concern:*

Be it known that I, CHARLES PEARSON, a citizen of the United States, residing at Chicago, in the county of Cook and State of Illinois, have invented certain new and useful Improvements in Mowing-Machines, of which the following is a full, clear, and exact specification.

My invention relates to mowing machines. It has among its objects to operatively connect the finger bar to the coupling frame and mower in an improved manner whereby, upon tilting of the bar, a constant lead upon the same may be maintained. A further object of my invention is to provide improved means whereby the lead of the finger bar and the register of the knives may be maintained or adjusted as desired. A further object of my invention is to provide an improved coupling frame of rigid and sturdy construction which at the same time is readily adjusted and serves to effectually protect the operating parts of the mower, and especially the pitman and crank wheel, certain parts of the coupling frame being readily removable when desired to permit removal of the crank shaft. These and other advantages of my improvement will be hereinafter described.

In this application, which is a continuation of my copending application, Serial No. 728,109, filed October 28, 1912, I have, for purposes of illustration shown in the accompanying drawings one embodiment which my invention may assume in practice.

In these drawings:—

Figure 1 is a top plan view of a mowing machine having my invention embodied in its construction;

Fig. 2 is a side elevation of Fig. 1;

Fig. 3 is a detached detail of part of the coupling frame mechanism, partly in section; and Fig. 4 is a cross section of the grassward end of the main coupling bar.

Referring to the drawings, wherein the same reference numerals designate like parts throughout the several views, 1 represents the main frame, 2 a driving axle journaled therein, 3 wheels journaled upon opposite ends of said axle, 4 a forwardly extending frame member, in which is journaled a crank shaft having a crank wheel 5 secured to its front end, the member 4 terminating in a bowl-shaped shield 6 partially surrounding the crank wheel and having its front side closed by a plate member 7, that is pivotally connected with the bowl by means of a bolt 8, and 9 represents a draft tongue secured to the wheel frame. 10 represents a coupling bar having its stubbleward end pivotally connected with the frame member 4 near its rear end. This bar inclines forward and grassward and terminates in a part 11 disposed at right angles with the line of draft of the machine substantially parallel with the ground. As shown it has mounted thereon a rocking coupling yoke 12, including a sleeve member 13 and depending arms 14, to which is pivotally connected the inner shoe 15 of the cutting mechanism. 16 represents a finger bar secured to the shoe, and 17 the knife operatively connected with the crank wheel 5 by means of a pitman 18. 19 represents a supplemental coupling frame member disposed in front of the pitman 18 as a guard, and disposed parallel with the part 11 of the member 10, having its grassward end turned laterally and pivotally connecting the coupling yoke, and its opposite end threaded and adjustably received by a threaded sleeve 20 integral with the pivoted plate member 7. The part 11 of the coupling bar 10 is threaded in an opposite direction to that of the member 19 and the sleeve member 13 is threaded to receive it.

With my improved construction, having the main and supplemental coupling bars threaded oppositely, or the main bar threaded right-hand and the supplemental bar threaded left-hand, in operation, when the coupling yoke is rocked about the bar, it will move inward or outward as a nut, and the supplemental bar turning in the sleeve 20 will move inward or outward in a manner to compensate for a longitudinal movement of the coupling yoke and maintain a proper lead or alinement of the guard fingers and knives and proper registration of the latter. By this compensating adjustment therefore, the knives will always register with the guard fingers at the same point in the stroke of the cutter bar and this registration will be maintained constant when the finger bar and cutter bar are tilted. It is further to be noted that by rotating the yoke about the coupling frame, the position of the cutter bar may be adjusted as desired in order to adjust the registration of the knife with respect to the guard, the front threaded bar and tilting mechanism being at that time disconnected in such a manner as to let the shoe turn on the threaded end of the coupling bar.

Obviously, by suitable adjustment of either of the adjustable connections, the lead of the bar 16 may also be adjusted if desired. Attention is here also directed to the fact that by the use of the supplemental coupling frame member 19 the yoke is securely braced upon the main frame and the pitman 18 is protected from breakage due to striking obstructions in the field. By the provision of this supplemental coupling frame member it is also possible to close the end of the bowl 6 and protect effectually the crank wheel 5, at the same time that a cover may be provided which will not hammer and break when the mower is passing over rough ground. Obviously also this protecting means does not interfere with the removal of the crank and crank shaft from the frame 4, the same being readily withdrawn when desired after simply releasing the bolt 8. It should here also be noted that by the provision of my improved coupling frame, I am enabled to use a yoke carrying member disposed substantially parallel to the ground and relatively high therefrom in such a manner as to enable increased clearance when passing over obstructions or rough ground.

While I have in this application described but one form which my invention may assume in practice, it is, of course, to be understood that this form is shown for purposes of illustration and may be modified without departing from the spirit of my invention.

What I claim as my invention, and desire to secure by Letters Patent, is:

1. In a mowing machine, a frame, a finger bar pivoted thereon, means for tilting said finger bar, and means for maintaining a constant lead on said bar during the tilting operation.

2. In a mowing machine, a frame, a finger bar pivoted thereon, guard fingers carried by said finger bar, a cutter bar movable in said finger bar, knives carried by said cutter bar, means for tilting said finger bar and said cutter bar, and means for maintaining a constant register of said knives with respect to said guard fingers during the tilting operation.

3. In a mowing machine, a frame, a finger bar pivoted thereon, guard fingers carried by said finger bar, a cutter bar movable in said finger bar, knives carried by said cutter bar, means for tilting said finger bar and said cutter bar, and means for maintaining a constant lead on said bars and a constant register of said knives with respect to said guard fingers during the tilting operation.

4. In a mowing machine, a main frame, a coupling bar carried thereby having a threaded grassward end disposed at right angles to the line of draft, and a yoke threaded on said end and adjusted longitudinally thereon as said yoke is tilted on said coupling bar.

5. In a mowing machine, a coupling frame, a yoke threaded thereon, a finger bar pivoted on said yoke, means for tilting said yoke, and means for maintaining a constant lead on said bar during the tilting operation.

6. In a mowing machine, a coupling frame, a yoke threaded thereon, a finger bar pivoted on said yoke, guard fingers carried by said finger bar, a cutter bar movable in said finger bar, knives carried by said cutter bar, means for tilting said yoke, and means for maintaining a constant register of said knives with respect to said guard fingers during the tilting operation.

7. In a mowing machine, a coupling frame, a yoke threaded thereon, a finger bar pivoted on said yoke, guard fingers carried by said finger bar, a cutter bar movable in said finger bar, knives carried by said cutter bar, means for tilting said yoke, and means for maintaining a constant lead on said bars and a constant register of said knives with respect to said guard fingers during the tilting operation.

8. In a mowing machine, a machine frame, a rising and falling coupling bar pivotally connected thereto having a transversely disposed grassward portion, a yoke carried on said portion, means whereby said yoke may be adjusted bodily lengthwise thereof, and coöperating means connecting said yoke and frame simultaneously adjustable with said yoke.

9. In a mowing machine, a machine frame, a rising and falling coupling bar pivotally connected thereto having a transversely disposed grassward end, a rotatable yoke adjustable longitudinally of said end, and a transversely disposed simultaneously adjustable coöperating coupling bar operatively connected to said yoke at one end and pivotally connected at its opposite end to said frame.

10. In a mowing machine, a machine frame, a rising and falling coupling bar pivotally connected thereto having a transversely disposed end extending substantially parallel to the ground, a yoke rotatably mounted on said end, and a simultaneously adjustable coöperating transversely disposed coupling bar operatively connected to said yoke and pivotally connected to said machine frame.

11. In a mowing machine, a main frame, a yoke rotatable thereon, a finger bar pivoted on said yoke, means for tilting said yoke, means for moving the ends of said yoke transversely of said main frame when tilted, and means for maintaining a constant lead on said bar during the tilting operation.

12. In a mowing machine, a main frame, a coupling frame carried thereby, a yoke rotatable thereon, a finger bar pivoted on said yoke, guard fingers carried by said finger bar, a cutter bar movable in said finger bar, knives carried by said cutter bar, means for tilting said yoke, means for moving the ends of said yoke transversely of said main frame when the yoke is tilted, said means maintaining a constant register of said knives with respect to said guard fingers during the tilting operation.

13. In a mowing machine, a coupling frame, a yoke rotatable thereon, a finger bar pivoted on said yoke, guard fingers carried by said finger bar, a cutter bar movable in said finger bar, knives carried by said cutter bar, means for tilting said yoke, and means for maintaining a constant lead on said bars and a constant register of said knives with respect to said guard fingers during the tilting operation.

14. In a mowing machine, a machine frame, a rising and falling coupling bar pivotally connected thereto and having a transversely disposed portion, a yoke threaded on said portion, a coöperating coupling bar pivoted to said yoke and frame, and means for varying the effective length of said coöperating bar as said yoke is rotated.

15. In a mowing machine, a frame, a coupling bar thereon, a yoke carried on said coupling bar, a finger bar operatively connected to said yoke, guard fingers carried by said finger bar, a cutter bar movable in said finger bar, knives carried by said cutter bar, means for tilting said yoke, and operative connections between said yoke and said coupling bar and said yoke and said frame whereby during the tilting of said yoke a constant lead is maintained on said finger bar and said cutter bar and a constant register is maintained between said knives and said guard fingers.

16. In a mowing machine, a frame, a coupling bar thereon, a yoke carried on said coupling bar, a finger bar operatively connected to said yoke, guard fingers carried by said finger bar, a cutter bar movable in said finger bar, knives carried by said cutter bar, operative connections between said yoke and said coupling frame, and operative connections between said yoke and said machine frame, said operative connections being adjustable longitudinally when said finger bar and cutter bar are tilted to maintain a constant lead thereon and adjustable independently to vary the lead of said finger bar and said cutter bar and the register of said knives with respect to said guard fingers.

17. A mowing machine including a wheel frame, a coupling frame including two transverse bars having their stubbleward ends pivotally connected with the stubbleward side of said frame, a rocking coupling yoke carried by one of said bars and moved longitudinally thereon when turned in either direction, and compensating means connected with the remaining coupling bar and operative to increase or shorten its effective length when said yoke is turned in opposite directions.

18. A mowing machine including a wheel frame, an inner shoe and a finger bar secured thereto, a main coupling bar having its stubbleward end pivotally connected with said frame and its opposite end threaded, a rocking coupling yoke including a threaded sleeve carried by the threaded end of said coupling bar and having said shoe pivotally connected therewith, and a supplemental coupling bar having one end pivotally connected with said yoke and its opposite end threaded oppositely to said main bar and pivotally connected with said frame.

19. A mowing machine including a wheel frame, an inner shoe, a finger bar pivotally connected therewith, a main coupling bar having its stubbleward end pivotally connected with said frame and its opposite end threaded, a rocking coupling yoke including a threaded sleeve mounted upon the threaded end of said bar, an oppositely threaded sleeve member pivotally connected with said frame, and a supplemental coupling bar having one end threaded and received by said sleeve member and its opposite end pivotally connected with said yoke.

20. In a mowing machine, a frame, a crank shaft journaled thereon, a crank wheel carried on said shaft, a bowl partially inclosing said crank wheel, an end member movable in a vertical plane pivoted on said bowl and coöperating therewith and inclosing said crank wheel, a coupling frame carried on said frame, a yoke carried on said coupling frame, and a coupling rod pivotally connected at one end of said yoke and adjustably connected at its opposite end to said vertically movable end member.

21. In a mowing machine, a frame, an adjustable coupling frame thereon, a yoke carried on said coupling frame, a crank shaft journaled on said frame, a crank wheel secured to said shaft, a bowl carried on said frame and partially surrounding said crank wheel, a removable end wall for said bowl, pivoted thereto and coöperating therewith to inclose said crank wheel, and a coupling member operatively connected at its grassward end to said yoke and adjustably connected at its stubbleward end to said end wall member.

22. A mowing machine including, in combination, a main frame having a forwardly extending tubular member, a crank shaft journaled in said tubular member, a crank wheel secured to the front end of said crank shaft, a bowl forming part of said main frame extending in front of said crank wheel and partially surrounding the same, a removable member pivotally connected with said bowl and forming the front end wall thereon, a coupling frame including a yoke, and a coupling member connecting said yoke with the removable end wall of said bowl.

In testimony whereof I affix my signature, in the presence of two witnesses.

CHARLES PEARSON.

Witnesses:
R. W. MARTIN,
RAY PATTISON.

Copies of this patent may be obtained for five cents each, by addressing the "Commissioner of Patents, Washington, D. C."